United States Patent
Petty

(12) 
(10) Patent No.: US 8,313,555 B2
(45) Date of Patent: Nov. 20, 2012

(54) METHOD AND APPARATUS FOR CIRCULATING FLUIDIZED BED SCRUBBER AUTOMATED TEMPERATURE SETPOINT CONTROL

(75) Inventor: Paul E. Petty, Eldersburg, MD (US)

(73) Assignee: Allied Environmental Solutions, Inc., Columbia, MD (US)

( * ) Notice: Subject to any disclaimer, the term of this patent is extended or adjusted under 35 U.S.C. 154(b) by 441 days.

(21) Appl. No.: 12/592,202

(22) Filed: Nov. 20, 2009

(65) Prior Publication Data

US 2010/0147146 A1    Jun. 17, 2010

Related U.S. Application Data

(60) Provisional application No. 61/199,930, filed on Nov. 21, 2008.

(51) Int. Cl.
    *B01D 53/02*      (2006.01)
(52) U.S. Cl. ............ 95/10; 95/11; 95/14; 95/17; 95/108; 95/137; 423/243.08; 96/111; 96/112; 96/123; 96/150
(58) Field of Classification Search .............. 95/16, 108, 95/187, 199, 233; 96/112, 115, 123, 150, 96/251
See application file for complete search history.

(56) References Cited

U.S. PATENT DOCUMENTS

| | | | |
|---|---|---|---|
| 3,862,295 A * | 1/1975 | Tolles | 423/244.03 |
| 4,129,250 A | 12/1978 | Chaikin et al. | |
| 4,310,498 A | 1/1982 | Malki et al. | |
| 4,610,849 A | 9/1986 | Van Camp et al. | |
| 4,809,537 A | 3/1989 | Glover et al. | |
| 4,836,991 A | 6/1989 | Ishiguro et al. | |
| 4,890,479 A | 1/1990 | Glover et al. | |
| 5,006,322 A | 4/1991 | Schuetzenduebel et al. | |
| 5,460,041 A | 10/1995 | Andes et al. | |
| 5,756,058 A * | 5/1998 | Watanabe et al. | 423/238 |
| 5,791,268 A | 8/1998 | Battles et al. | |
| 5,943,865 A * | 8/1999 | Cohen | 60/653 |
| 6,152,053 A * | 11/2000 | Czarnecki et al. | 110/345 |
| 7,125,007 B2 * | 10/2006 | Wulteputte | 261/128 |
| 2006/0239881 A1 * | 10/2006 | Nagayasu et al. | 423/240 R |

* cited by examiner

*Primary Examiner* — Duane Smith
*Assistant Examiner* — Christopher P Jones
(74) *Attorney, Agent, or Firm* — Ober, Kaler, Grimes & Shriver; Royal W. Craig

(57) ABSTRACT

A method and system for automated control of the operating temperature setpoint of a circulating fluidized bed (CFB) scrubber within a pre-determined range of approach temperatures to the adiabatic saturation temperature of the CFB scrubber exhaust stream to maintain an optimal operating temperature, thereby reducing low temperature sulfuric acid corrosion and deposition of wet materials, and high temperature excess reagent use. A Dewcon® Moisture Analyzer (or equivalent) is connected in the exhaust stream of the CFB scrubber. The Dewcon® Moisture Analyzer transmits adiabatic saturation temperature data of the exhaust stream to the CFB scrubber system controller. Based on pre-programmed parameters, the system controller adjusts the CFB scrubber temperature setpoint.

21 Claims, 1 Drawing Sheet

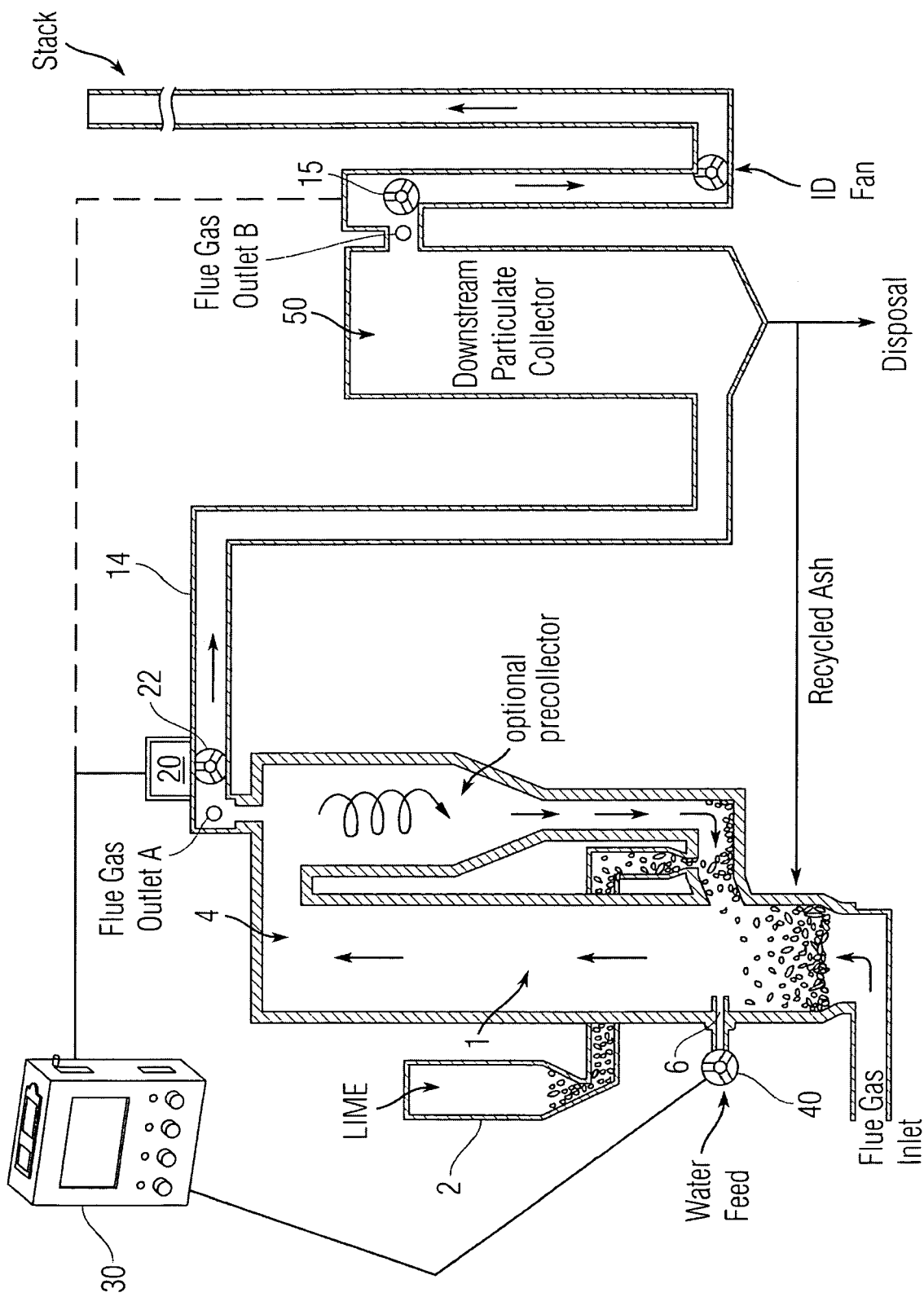

METHOD AND APPARATUS FOR CIRCULATING FLUIDIZED BED SCRUBBER AUTOMATED TEMPERATURE SETPOINT CONTROL

CROSS-REFERENCE TO RELATED APPLICATION(S)

The present application derives priority from U.S. provisional application Ser. No. 61/199,930, filed 21 Nov. 2008.

FIELD OF THE INVENTION

The present invention relates to a method and system for automated control of the operating temperature setpoint of a circulating fluidized bed (CFB) scrubber within a pre-determined range of approach to saturation temperatures relative to the adiabatic saturation temperature of the CFB scrubber exhaust stream.

BACKGROUND OF THE INVENTION

Power companies' efforts to reduce sulfur dioxide and other emissions have focused largely on the use of advanced emission control equipment and improving operating practices. A number of different Air Quality Control Systems (AQCS) have evolved for flue gas cleaning and desulfurization including Baghouses, Dry Scrubbers and selective catalytic reduction (SCR) devices. In most dry scrubbers, lime and water are sprayed into the gases. The lime and sulfur react to capture the sulfur, producing a waste byproduct. These scrubbers can reduce sulfur dioxide emissions by more than 95 percent. However, the incoming flue gas is very hot. It must be cooled to near its adiabatic saturation temperature wherein the gas holds as much water vapor as it can without causing adverse effects. Scrubbers control the flue gas temperature by varying their water injection rate. More water cools the flue gas more, and vice versa. The water injection rate is usually adjusted in accordance the scrubber outlet flue gas temperature, and so it is necessary to establish a scrubber exit temperature setpoint. The temperature setpoint is chosen in relationship to the gas chemistry, so that a certain margin is maintained between the scrubber outlet temperature and the water dew point (often called the adiabatic saturation temperature). This margin, often called the approach-to-saturation or ATS, is a primary control variable toward optimizing $SO_2$ collection efficiency. Typically this margin is maintained at 30 degrees Fahrenheit. If the temperature is too low, sulfuric acid may condense downstream resulting in corrosion of the scrubber system and also there will be problems with buildups of lime and ash on the walls and in the hoppers of the scrubber and/or downstream particulate collector (an electrostatic precipitator or fabric filter). If the temperature is too high, lime consumption is affected and the scrubber will be using more lime than required, resulting in increased operation costs.

Traditionally, no appropriate instrument has existed that was rugged enough to place into the scrubber exhaust outlet area to reliably monitor the saturation temperature. Therefore, the typical method of choosing the temperature setpoint is to manually test the saturation temperature of the flue gas by periodic hand sampling and changing the temperature setpoint accordingly. This is not ideal, as changes in several variables such as boiler load, boiler fuel or boiler operation will cause the flue gas saturation temperature to change. As a result, unless the intervals between periodic manual tests are very short, it is very difficult to maintain the ideal scrubber temperature setpoint.

It would be far more advantageous to install a more robust temperature sensor (able to withstand the harsh conditions of the CFB scrubber exhaust exit) at or near the CFB scrubber exhaust exit or at or near the outlet of the downstream particulate collector, and to monitor it to measure saturation temperature at the exit and feed periodic measurements back to a control system to directly control the water injection. With the improved control on moisture injection and the ability to monitor the flue gas dewpoint temperature in real-time, it is possible to automatically adjust the scrubber temperature setpoint within pre-determined parameters to maintain optimal scrubber conditions, thereby increasing $SO_2$ removal efficiency, improving scrubber system reliability and/or reducing lime consumption.

SUMMARY OF THE INVENTION

The present invention is a method and system for automated temperature setpoint control in a circulating fluidized bed scrubber. The system employs a robust temperature sensor at or near the CFB scrubber exhaust exit, or at or near the downstream particulate collector exhaust exit, in either case the temperature sensor being able to withstand the harsh conditions of the CFB scrubber/particulate collector exhaust exit. The temperature sensor output is monitored to measure saturation temperature at the exit and feed periodic measurements back to a control system to directly control the water injection and increase $SO_2$ removal efficiency.

Preferably, the temperature sensor is a Dewcon® Moisture Analyzer (DMA) or its functional equivalent installed at or near the CFB scrubber exhaust exit or, alternatively, at or near the downstream particulate collector exhaust exit. The DMA is in communication with the scrubber control system and measures the saturation temperature and, optionally, other variables such as relative humidity, at the exit and transmits the data to the scrubber control system using a 4-20 mA current loop. In response the measurement(s) taken by the DMA and using pre-determined temperature control settings, the scrubber control system adjusts the scrubber temperature setpoint in real time to the pre-determined optimum temperature. For example, where a 30 degree Fahrenheit margin above flue gas saturation temperature is desired and pre-programmed into the scrubber control system, if the DMA measures a saturation temperature of the flue gas at 130 degrees Fahrenheit and communicates that temperature via the current loop to the scrubber control system, the scrubber control system adjusts the outlet temperature setpoint so that a temperature of 160 degrees Fahrenheit is maintained.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 1 is a diagram of one embodiment of the present invention incorporated in a CFB scrubber temperature measurement and adjustment feedback loop.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF THE PREFERRED EMBODIMENTS

The present invention is a method and system for automated control of the operating temperature of a circulating fluidized bed (CFB) scrubber within a pre-determined range of approach to saturation temperatures relative to the adiabatic saturation temperature of the CFB scrubber exhaust stream. The invention increases scrubber performance, prevents corrosion from sulfuric acid condensation and material buildup caused by low CFB scrubber exhaust temperatures and minimizes excess lime usage caused by high scrubber exhaust temperatures.

FIG. 1 is a diagram of one embodiment of the present invention incorporated in an Air Quality Control System (AQCS) comprising a semi-dry circulating fluidized bed (CFB) scrubber 1. This is a typical CFB semi-dry scrubber 1 wherein dry lime ($Ca(OH)_2$), delivered or created at the site or in situ to the scrubber from other calcium products, is injected directly from a reservoir through a feed line 2 into the CFB reactor 4 as a dry sorbent. The flue gas enters the bottom of the CFB reactor 1 and flows upward past one or more water spray nozzles 6 for cooling water injection. When the flue gas comes in contact with the lime, the lime chemically reacts with $SO_2$, HCl, HF, $SO_3$ and other acids in the flue gas to capture and neutralize these acid gases. The cooling water in the wetted lime evaporates and simultaneously cools the flue gas. The reactor provides the necessary reaction and drying retention time from bottom to top, and then the solids enter a downstream particulate collector. The CFB semi-dry scrubber 1 may incorporate an optional cyclonic pre-collector for removal of most of the fly ash before downstream particulate collection. Pre-collectors are a common design feature in many European spray dry scrubber plants. The flue gas exits from the reactor 1 through an outlet duct 14. The flue gas flows through outlet duct 14 to a downstream particulate collector 50 where the solids are separated from the gas stream. The flue gas stream continues through an outlet duct 15 to a conventional downstream Induced Draft Fan (ID Fan), out through the ID Fan and an exhaust stack. The particulate collector 50 may be a conventional dry particulate collector such as a baghouse, or alternatively an electrostatic precipitator, or cyclone collector. Past the particulate collector 50 most of the solids are fed back into the reactor 1 through a recirculating solids return line. The remaining solids are removed from the system as waste. The by-product ash is a dry powder with low moisture content primarily consisting of calcium sulfite/sulfate, calcium chloride, other calcium salts and fly ash, and this is conveyed out. In a typical coal or oil fired steam generator, the temperature of the flue gas in outlet duct 14 is at a temperature in the range of 150 to 200 F although for other applications, such as those with high flue gas chloride levels, this temperature could be as high as 300 deg F. The present invention relies on the proportionality of the flue gas temperature as the flue gas travels through the system. Specifically, the temperature of the flue gas in outlet duct 14 is directly proportional to the temperature of the flue gas in the CFB reactor 1. Similarly, the temperature of the flue gas in the outlet duct 15 downstream of the particulate collector is directly proportional to the temperature of the flue gas in the CFB reactor. In accordance with the present invention, by measuring the temperature of the flue gas in either of outlet ducts 14, 15 it becomes possible to know whether the flue gas in the CFB reactor 1 falls within a predetermined range. Moreover, since the temperature of the flue gas in the CFB reactor 1 can be controlled by injecting more or less water through the liquid feed, it is possible to maintain the flue gas in the CFB reactor 1 within an acceptable range of the saturation temperature. This is herein accomplished by incorporating a control system to control the amount of water injection in accordance with the temperature of the flue gas in outlet ducts 14 or 15. The control system has a simple goal, to maintain the outlet duct 14 temperature or outlet duct 15 temperature above an acceptable setpoint. For example, if the flue gas saturation temperature inside the reactor is 130 degrees F., and it is desirable to maintain a 30 degree F. margin above flue gas saturation temperature at the CFB scrubber exit, then the control system automatically adjusts the water feed spray at nozzle(s) 40 to maintain the outlet duct 14 temperature at or above a setpoint of 160 degrees F.

To accomplish the foregoing a control system is provided for monitoring the outlet flue gas leaving the exhaust duct 14 (or duct 15) and controlling the temperature of the flue gas entering the dry scrubber reactor 1 in accordance therewith, at a preselected temperature level near the adiabatic saturation temperature of the flue gas. This enables greater amounts of sulfur oxide absorbent slurry to be sprayed into the flue gas thereby allowing the treatment of flue gas containing high levels of sulfur oxides and allowing higher sulfur oxide removal efficiencies. The control system includes a hardened temperature sensor 20 with probe 22 installed in the outlet duct 14 at or near the CFB scrubber exhaust exit, or at or near the downstream particulate collector exhaust exit in duct 15, in either case to monitor saturation temperature at the exit. The temperature sensor 20 is connected to a programmable controller 30. The controller 30 comprises any of a dedicated programmable logic controller (PLC), a plant distributed control system (DCS) or similar controller for comparing the temperature measured by sensor 20 at probe 22 to a predetermined setpoint, and for adjusting the water injection rate for temperature control. As the CFB dry scrubber 1 outlet temperature exceeds the set point temperature, programmable controller 30 automatically increases the cooling water rate to the spray nozzles. Conversely, the cooling water flow rate is decreased as the outlet gas temperature falls below the set point temperature. In this manner the operating temperature of the circulating fluidized bed (CFB) scrubber is maintained within a pre-determined range of approach temperatures to the adiabatic saturation temperature (ATS). It is suggested that the flue gas be cooled to within 30-45° F. of the adiabatic saturation temperature by spraying the water directly into the CFB vertical conditioning chamber, and given a particulate residence time of typically 20-30 minutes as much as 99% $SO_2$ removal efficiency is realized.

The hardened temperature sensor 20 with probe 22 may be a Dewcon® Moisture Analyzer or its functional equivalent with probe placed in the exhaust duct 14 or 15 of the circulating fluidized bed (CFB) scrubber 1. The temperature probe 22 preferably employs a 4-20 mA output, and the Dewcon® Moisture Analyzer (or equivalent) includes a communications port which is connected to the programmable controller (PLC), DCS or other controller 30.

The Dewcon® Moisture Analyzer 20 (or equivalent) measures the adiabatic saturation temperature of the CFB scrubber exhaust in either of ducts 14 or 15 and transmits the data to the Controller 30. Alternatively, the Dewcon® Moisture Analyzer 20 (or equivalent), alone or in combination with the above-described adiabatic saturation temperature measurement, may additionally measure other variables such as relative humidity. Controller 30 may be any programmable logic controller (PLC), DCS or other controller such as typically used for automation of industrial processes. The Controller 30 is pre-programmed to maintain a temperature setpoint of the CFB scrubber 1 within a given range (e.g., 30 degrees Fahrenheit) above the adiabatic saturation temperature. The adiabatic saturation temperature is measured in real time and is communicated to the CFB scrubber controller 30, which accordingly adjusts the CFB scrubber temperature setpoint within pre-programmed parameters in real time. Presently, it is envisioned that the adiabatic saturation temperature range for most (95%) projects will be set between 30-40 deg F. with the possibility of a range of, for example, 20 deg F. to 60 deg F., and on extremely rare occasions something outside that 20-60 deg range. In the preferred embodiment probe 22 is mounted on a mounting structure which, in a preferred embodiment, may comprise a 4" pipe with 150 # ANSI flange.

The controller 30 determines whether the sensed temperature is above or below the predetermined set point and by how much. Controller 30 determines a proper adjustment based on a simple linear function or incremental cross-reference table. A proportionate signal is emitted from the controller 30 and passed to a suitable actuator valve 40 associated with the inlet water feed line (or water return line) which opens the feed line (or closes the return line) to increase the spray of water into the reactor in order to decrease the flue gas temperature entering the scrubber absorption chamber.

As an example of the process, for a typical coal fired application having a scrubber flue gas inlet flow rate of 2,110,000 lb/hr at 307 deg. F., and with gas chemistry resulting in a saturation temperature at the scrubber exit of 130 deg. F., it is desired to maintain the scrubber exit temperature at 160 deg F. For the above conditions, approximately 78,000 lb/hr of water is required. In this example, due to an instantaneous 10% decrease in the inlet gas flow rate, we assume that the actually measured outlet temperature falls to 145 deg. F., as measured by sensor 20 with probe 22 placed in outlet duct 14. If controller 30 is programmed with a temperature setpoint value of 160 deg. F., the temperature control system would react. The controller 30 would partially close the valve 40 to decrease the water injection rate to approximately 70,000 lb/hr, resulting in an increase of the gas temperature back to 160 deg F. This injection rate would then be maintained so long as the new operating conditions remain unchanged.

The software logic used by the controller 30 continuously adjusts the position of the control valve 40 relative to the degree if difference between the actual measured temperature and the setpoint, e.g., how far the actual temperature is above or below that setpoint. Thus, the signal emitted by the controller 30 will adjust the valve 40 more drastically if the measured value is very different than the setpoint. The actual correlation between measured difference and degree of valve 40 adjustment may be quantitatively determined.

Alternatively, the system may be setup such that the water injection is increased not by opening valve 40 on the water feed line, but instead by closing down a valve on the water return line back to a water tank. Typically, on each water nozzle 6 there is a water supply line and a water return line to the water tank. Water supplied to the nozzle 6 that is not injected into the scrubber 1 leaves the nozzle 6 via the return line. This means that water injected into the scrubber 1 can be controlled either by a control valve 40 on the supply line (wherein opening of valve 40 increases water injection), or on the return line (wherein closing the valve 40 increases water injection). The valve 40 may be placed on the supply or return line with the foregoing in mind, and one skilled in the art should understand that both alternatives are within the scope and spirit of the invention. As the dry scrubber outlet temperature exceeds the predefined set point temperature, the cooling water rate to the spray nozzles 6 increases. The cooling water flow rate is decreased as the outlet gas temperature falls below the set point temperature. By maintaining the flue gas temperature leaving the reactor 1 above the adiabatic saturation temperature, it is ensured that only dry particulate matter will be present in the exhaust flue gas, and this can be efficiently removed by a downstream dry particulate collector such as a baghouse, or alternatively an electrostatic precipitator, or cyclone collector.

It should now be apparent that the above-described system has the ability to monitor the flue gas dewpoint temperature in real-time, and automatically adjust the scrubber temperature setpoint within pre-determined parameters to maintain optimal scrubber conditions, thereby increasing $SO_2$ removal efficiency, improving scrubber system reliability and/or reducing lime consumption. Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

I claim:

1. In a circulating fluidized bed (CFB) scrubber for removing sulfur oxides from a flue gas produced during the combustion of a sulfur-bearing fuel in a reactor vessel, the CFB further comprising a flue gas inlet duct leading to said reactor vessel, a dry circulating fluidized bed of dry lime sorbent, fuel ash and by-products in said reactor vessel, a water spray infeed for spraying cooling water into said reactor vessel, and an exhaust outlet duct leading from said reactor vessel to a downstream particulate collector, an improvement comprising:

a probe mounted in the exhaust outlet duct proximate said reactor vessel or downstream particulate collector for sensing moisture characteristics of the flue gas leaving the CFB scrubber, said moisture characteristics including humidity of the flue gas;

a temperature monitor for monitoring approach to adiabatic saturation temperature at said probe based on said sensed moisture characteristics;

a programmable controller for automatically periodically comparing said sensed approach to adiabatic saturation temperature at said probe to at least one predetermined setpoint and for selectively outputting a cooling water adjustment signal in response thereto;

an actuator coupled to said water spray infeed for adjusting an amount of cooling water sprayed into said reactor vessel, said actuator being electrically connected to said programmable controller;

whereby whenever said sensed approach to adiabatic saturation temperature level differs from the predetermined setpoint said programmable controller outputs a cooling water adjustment signal to said actuator to adjust the amount of cooling water sprayed into said reactor vessel.

2. The improvement of claim 1, whereby said programmable controller includes memory storing a predetermined temperature setpoint, and software for comparing said sensed approach to adiabatic saturation temperature to the predetermined setpoint, and for outputting a cooling water adjustment signal to said actuator when the sensed approach to adiabatic saturation temperature is less than the predetermined setpoint to decrease a volume of cooling water sprayed into said reactor vessel.

3. The improvement of claim 2, whereby said software outputs a cooling water adjustment signal to said actuator when the sensed approach to adiabatic saturation temperature is greater than the predetermined setpoint to increase a volume of cooling water sprayed into said reactor vessel.

4. The improvement of claim 3, further comprising a dry lime feed for injecting dry lime to said reactor vessel as a sorbent.

5. The improvement of claim 2, whereby the CFB further comprises a water return line for returning cooling water that is not injected into said reactor vessel to a water source, said actuator controls water flow in said water return line, and said cooling water adjustment signal opens said actuator when the sensed approach to adiabatic saturation temperature is less than the predetermined setpoint to decrease a volume of cooling water sprayed into said reactor vessel.

6. The improvement of claim 5, whereby said cooling water adjustment signal closes said actuator when the sensed approach to adiabatic saturation temperature is greater than the predetermined setpoint to increase a volume of cooling water sprayed into said reactor vessel.

7. The improvement of claim 2, further comprising a dry lime feed for injecting dry lime to said reactor vessel as a sorbent.

8. The improvement of claim 1, wherein said flue gas produced during the combustion of a sulfur-bearing fossil fuel includes calcium products converted in situ into $Ca(OH)_2$.

9. The improvement of claim 1, wherein said temperature monitor comprises an environmentally-hardened moisture analyzer for monitoring relative humidity at said probe.

10. A system for automated control of an operating temperature of a circulating fluidized bed (CFB) scrubber having a reactor vessel, a dry circulating fluidized bed of dry lime sorbent, fuel ash and by-products in said reactor vessel, an inlet to said reactor vessel, and an exhaust exit, said CFB scrubber having a water spray near the inlet, the system comprising:
an actuated control valve for adjusting an amount of cooling water sprayed into said CFB scrubber;
a moisture analyzer having a probe installed downstream of said CFB scrubber exhaust exit for sensing humidity of the flue gas,
a temperature monitor for monitoring temperature of said flue gas;
a programmable or distributed controller with memory in communication with said actuated control valve and with said moisture analyzer and temperature monitor;
software resident in said memory for determining an approach to adiabatic saturation temperature at said probe based on said sensed humidity and temperature, said software being preprogrammed with a pre-determined approach to adiabatic saturation temperature setpoint and operative to control said actuated control valve to adjust an amount of cooling water sprayed in the water spray inlet when the outlet gas approach to adiabatic saturation temperature differs from a pre-determined setpoint.

11. The system for automated control of an operating temperature of a circulating fluidized bed (CFB) scrubber according to claim 10, wherein said software is operative to decrease an amount of cooling water sprayed in the scrubber vessel when the outlet gas approach to adiabatic saturation temperature falls below said pre-determined temperature setpoint.

12. The system for automated control of an operating temperature of a circulating fluidized bed (CFB) scrubber according to claim 11, wherein said software is operative to increase an amount of cooling water sprayed in the scrubber vessel when the outlet gas approach to adiabatic saturation temperature rises above said pre-determined temperature setpoint.

13. The system for automated control of an operating temperature of a circulating fluidized bed (CFB) scrubber according to claim 11, wherein said pre-determined approach to adiabatic saturation temperature setpoint is a pre-determined range above an adiabatic saturation temperature of the CFB scrubber exhaust.

14. The system for automated control of an operating temperature of a circulating fluidized bed (CFB) scrubber according to claim 13, wherein said pre-determined approach to adiabatic saturation temperature setpoint is within 20-60° F. of an adiabatic saturation temperature of the CFB scrubber exhaust.

15. The system for automated control of claim 11, whereby the CFB further comprises a water return line from the water spray inlet for returning cooling water that is not injected into said reactor vessel to a water source, said actuated control valve is operative to open said actuated control valve when the sensed approach to adiabatic saturation temperature is less than the predetermined setpoint to decrease a volume of cooling water sprayed into said reactor vessel.

16. The system for automated control of claim 15, whereby said actuated control valve is operative to close said actuated control valve when the sensed approach to adiabatic saturation temperature is greater than the predetermined setpoint to increase a volume of cooling water sprayed into said reactor vessel.

17. The system for automated control of an operating temperature of a circulating fluidized bed (CFB) scrubber according to claim 10, wherein said moisture analyzer probe is installed in said CFB scrubber exhaust exit.

18. The system for automated control of an operating temperature of a circulating fluidized bed (CFB) scrubber according to claim 10, further comprising a particulate collector downstream of said CFB scrubber exhaust exit, and said temperature sensor probe is installed downstream of said particulate collector.

19. The system for automated control of an operating temperature of a circulating fluidized bed (CFB) scrubber according to claim 10, wherein an operating temperature of the CFB scrubber is maintained within a pre-determined range of approach temperatures to the adiabatic saturation temperature (ATS).

20. The system for automated control of an operating temperature of a circulating fluidized bed (CFB) scrubber according to claim 19, wherein 99% $SO_2$ removal efficiency is realized.

21. The system for automated control of an operating temperature of a circulating fluidized bed (CFB) scrubber according to claim 19, wherein said temperature sensor comprises an environmentally-hardened moisture analyzer for monitoring relative humidity at said probe.

* * * * *